United States Patent

[11] 3,545,789

[72] Inventor Phillip Graham
2825 Glenmore Ave., Pittsburgh,
Pennsylvania 15216
[21] Appl. No. 709,999
[22] Filed March 4, 1968
Continuation-in-part of Ser. No.549,835,
May 13, 1966, Patent No. 3,392,989,
which is a continuation-in-part of Ser. No.
462,993, June 10, 1965, Patent No.
3,262,716, which is a continuation-
in-part of Ser. No. 355,568, March 30, 1964,
abandoned, which is a division of Ser. No.
97,658, March 22, 1961, Patent No.
3,129,017, which is a continuation-in-
part of Ser. No. 662,700, May 31, 1957,
Patent No. 2,977,135.
[45] Patented Dec. 8, 1970

[54] VEHICLE OCCUPANT SAFETY BARRIER
47 Claims, 27 Drawing Figs.
[52] U.S. Cl. ................................................ 280/150;
296/65; 297/384; 297/216
[51] Int. Cl. ....................................................... B60r 21/00
[50] Field of Search.......................................... 280/150;
296/56, 85; 214/122; 297/384, 390, 216

[56] References Cited
UNITED STATES PATENTS
1,219,513  3/1917  Wensinger................ 296/85

| 1,491,058 | 4/1924 | Nisbet................. | 296/85 |
|---|---|---|---|
| 2,475,588 | 7/1949 | Bierman............... | 244/122 |
| 2,833,554 | 5/1958 | Ricordi................ | 280/150 |
| 2,977,135 | 3/1961 | Graham................ | 280/150 |
| 3,095,170 | 6/1963 | Harb................... | 297/390 |
| 3,129,017 | 4/1964 | Graham................ | 280/150 |
| 3,262,716 | 7/1966 | Graham................ | 280/150 |
| 3,392,989 | 7/1968 | Graham................ | 280/150 |
| 3,393,010 | 7/1968 | Steinberg............. | 297/390 |
| 3,425,711 | 2/1969 | Rapier................. | 280/150 |
| FOREIGN PATENTS |  |  |  |
| 152,315 | 11/1955 | Sweden................ | 280/150 |
| 1,074,992 | 2/1960 | Germany.............. | 280/150 |
| 1,148,893 | 3/1963 | Germany.............. | 280/150 |

Primary Examiner—Kenneth H. Betts
Attorney—William J. Ruano

ABSTRACT: This invention pertains to a cushioning barrier that has shielding mounted closely in front of an operator or a passenger of an automobile or the like, to furnish a high degree of cushioning to the occupant when momentum forces him against the barrier during an accident. The barrier includes head and chest shields that can be folded and be moved laterally and downwardly to inconspicuous positions against a door, so they cannot obscure or obstruct the occupant while they are retracted. The head and chest shields can be triggered to quickly move them into protective positions in front of the occupant when a dangerous highway condition develops.

INVENTOR.
PHILLIP GRAHAM
BY
William J. Ruano
ATTORNEY

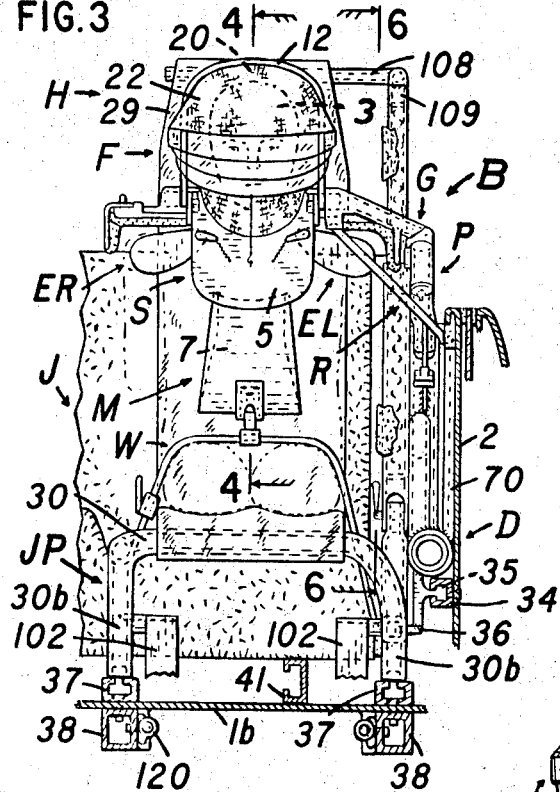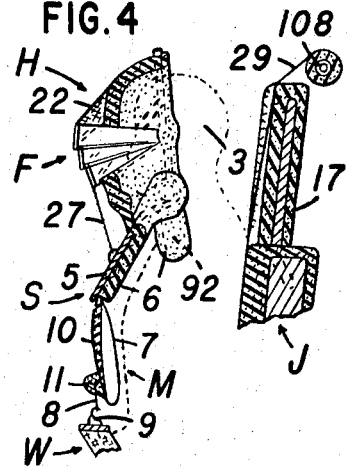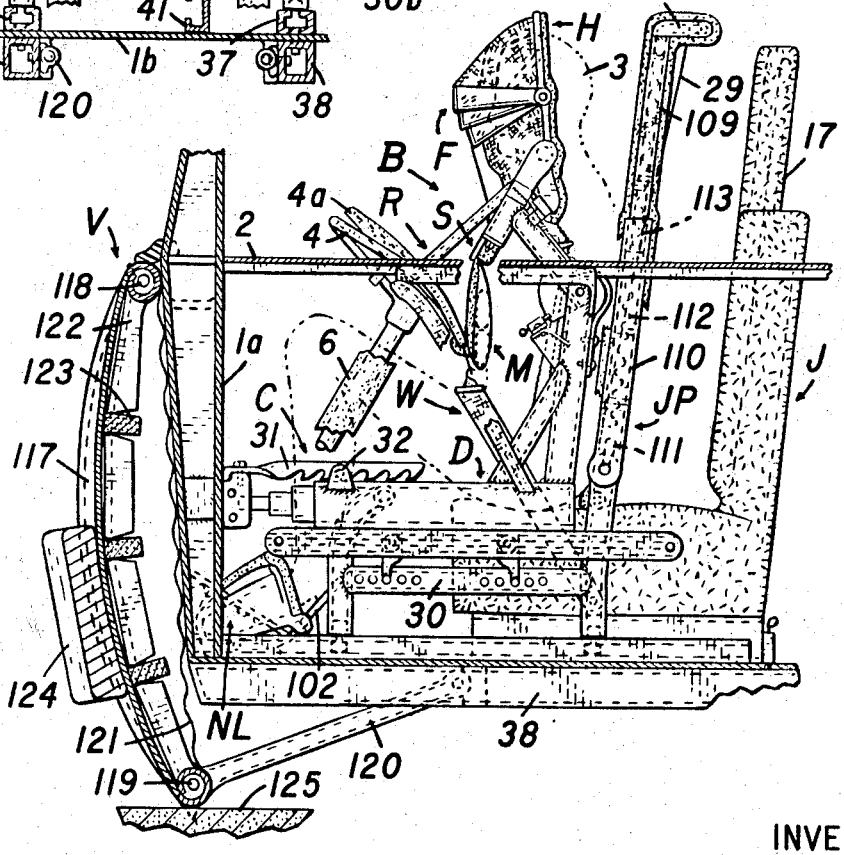

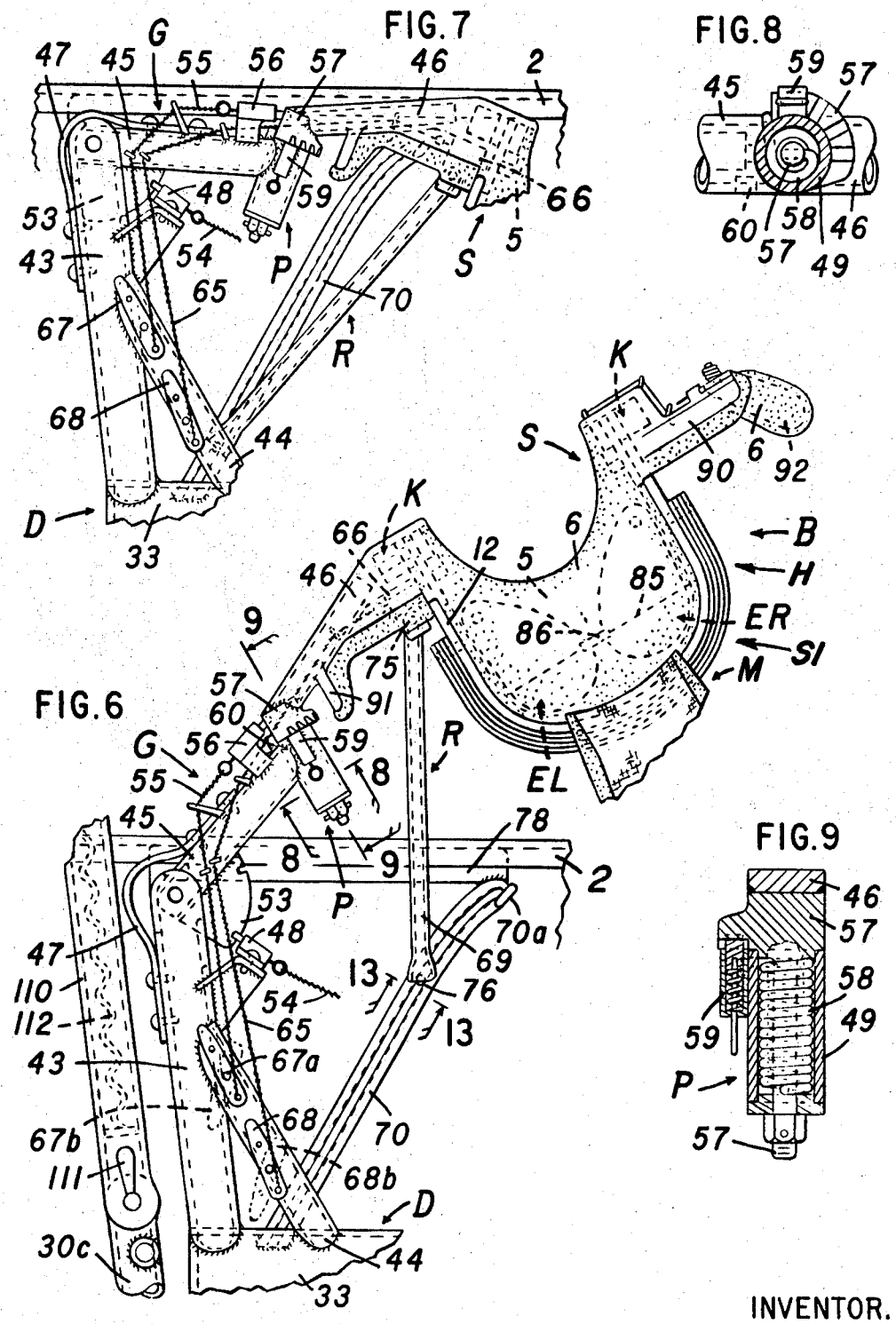

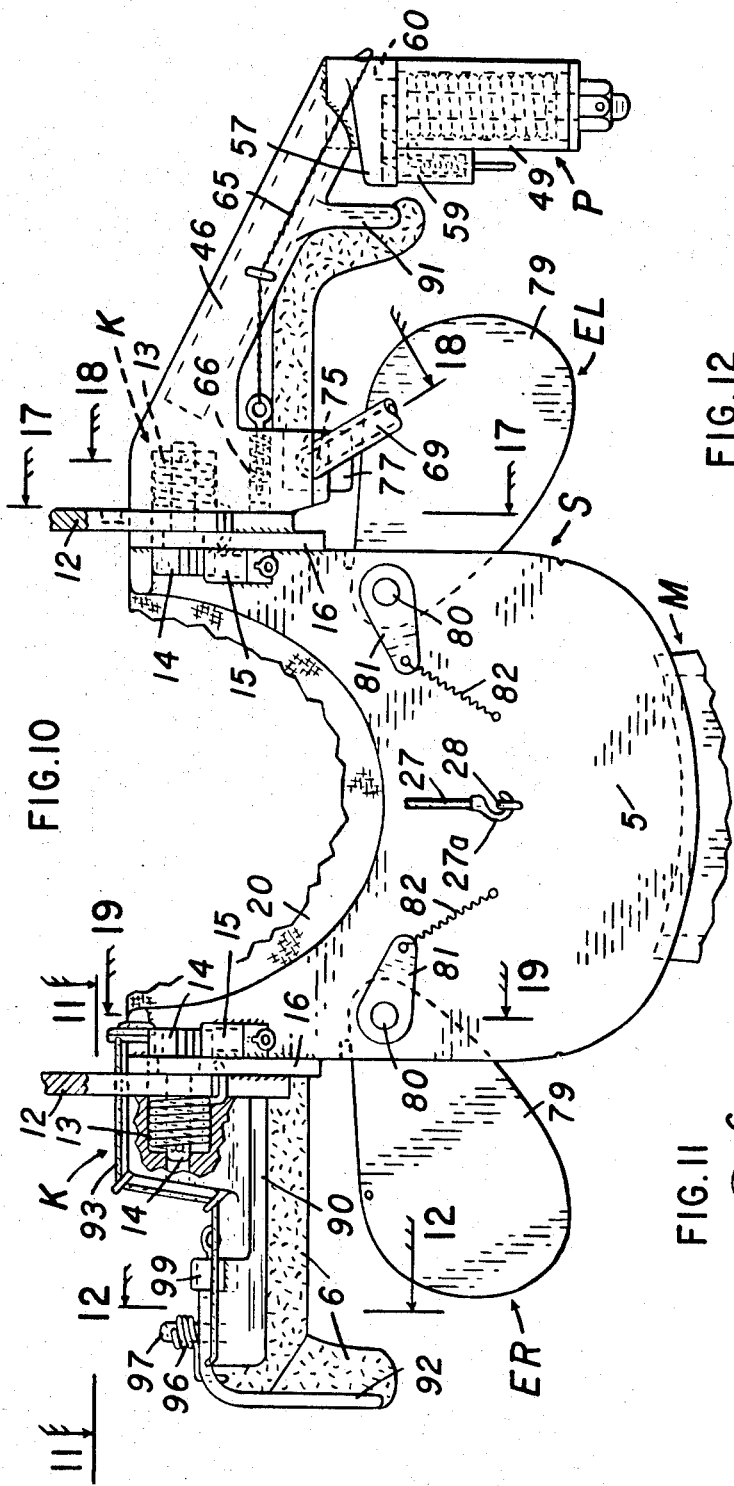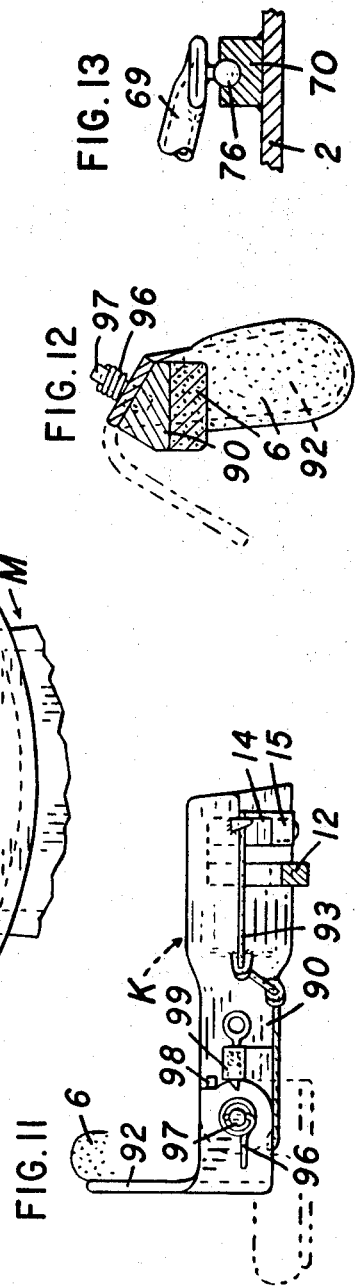

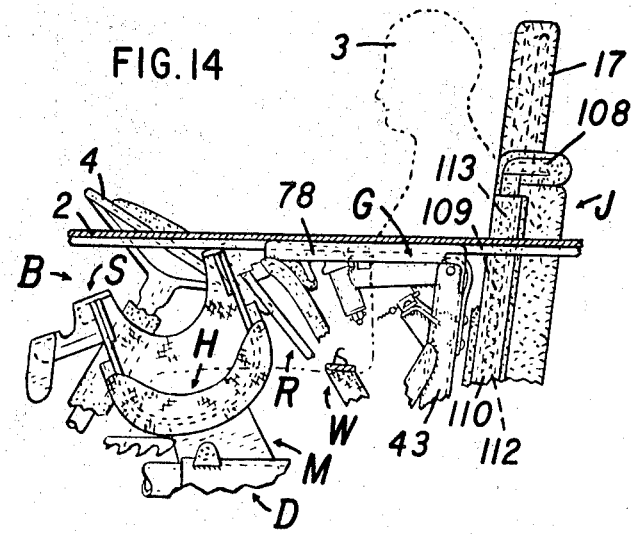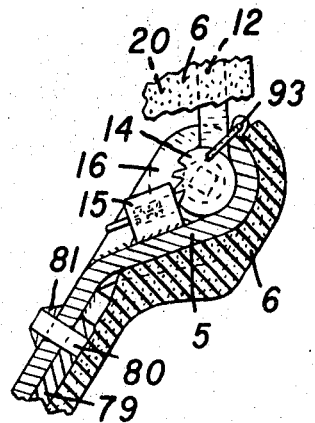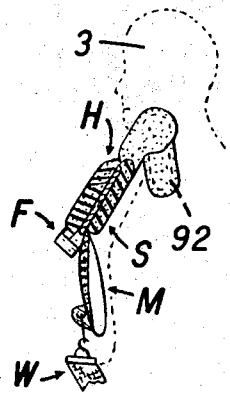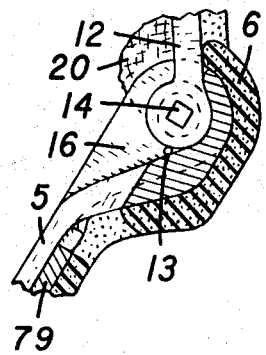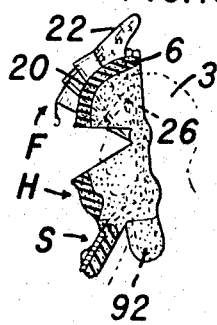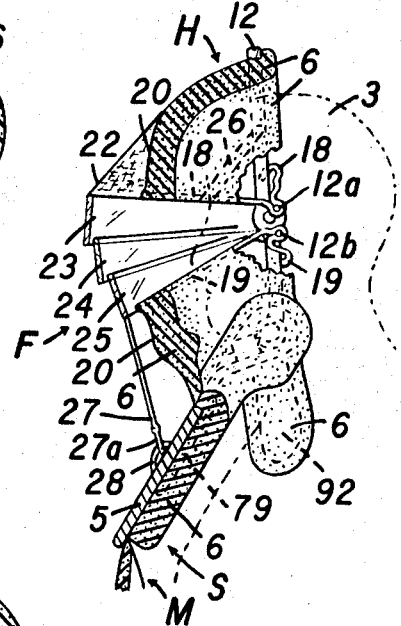

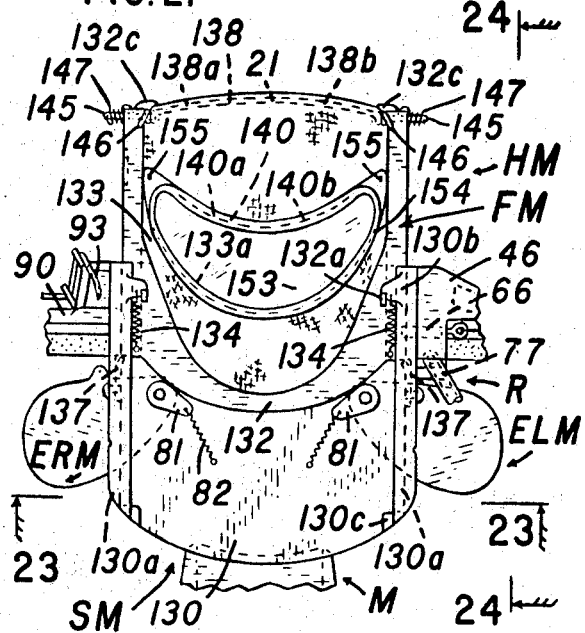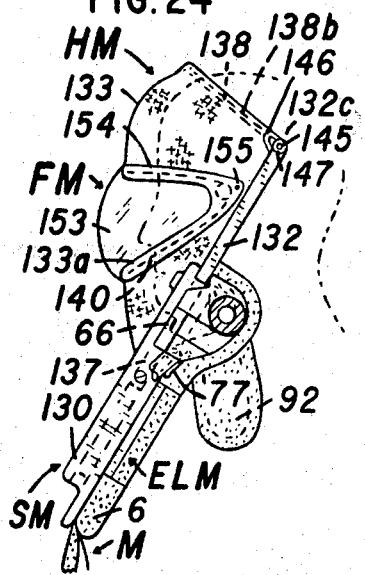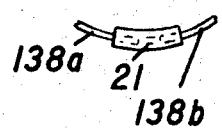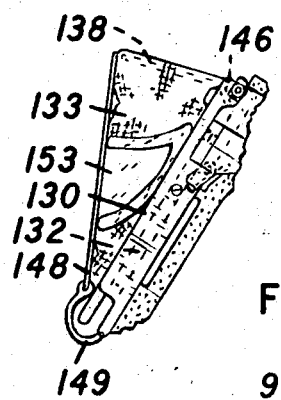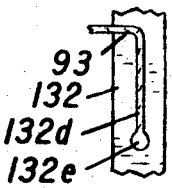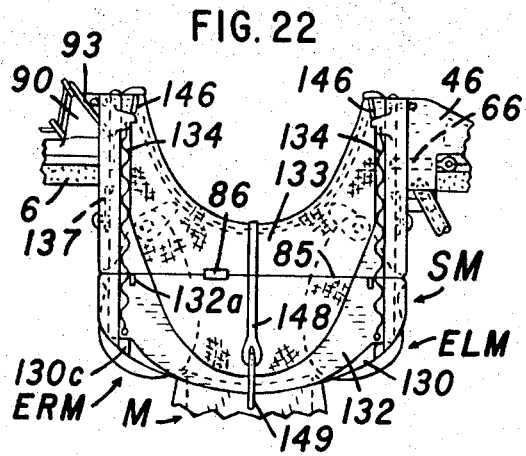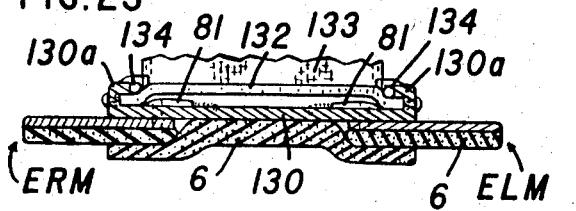

VEHICLE OCCUPANT SAFETY BARRIER

This invention is a continuation-in-part of my copending Pat. application Ser. No. 549,835, filed May 13, 1966 entitled Vehicle Occupant Safety Barrier, now Pat. No. 3,392,989. Applicant also claims rights to earlier filing date to common subject matter that is described in the present application, which was also described in his Pat. applications: Ser. No. 462,993, filed June 10, 1965, entitled Vehicle Occupant Safety Barrier, now Pat. No. 3,262,716; Ser. No. 355,568, which has been abandoned, filed Mar. 30, 1964, entitled Vehicle Occupant Safety Barrier; Ser. No. 97,658, filed Mar. 22, 1961, now Pat. No. 3,129,017, entitled Vehicle Occupant Safety Barrier; Ser. No. 662,770, filed May 31, 1957, entitled Vehicle Occupant Safety Barrier, now Pat. No. 2,977,135. The copending Pat. application Ser. No. 549,835 is a continuation-in-part of Pat. application Ser. No. 462,993 Pat. application Ser. No. 462,993, is a continuation-in-part of Pat. application Ser. No. 355,568, Pat. application Ser. No. 355,568 is a division of Pat. application Ser. No. 97,658 and Pat. application Ser. No. 97,658 is a continuation-in-part of Pat. application Ser. No. 662,770. The present application also describes improvements over the safety barriers of my U.S. Pat. No. 2,827,305.

This invention relates to a vehicle occupant safety barrier that is mounted in a vehicle and has yieldable shielding mounted closely in front of a seat for an occupant to protect the occupant during a rapid deceleration, especially that caused by a collision. More particularly, it relates to a cushioning barrier that may be positioned in an automobile in front of an operator or a passenger, to furnish a high degree of cushioning to the occupant when momentum forces him against it. Shielding of the barrier may be positioned between an operator and a steering wheel or the like to maintain protection for the operator while allowing him freedom of movement in operating the vehicle, including operating the vehicle throughout an accident period when the vehicle remains controllable. The barrier includes upper shielding that can be kept in a low retracted inconspicuous position, so it cannot obscure or obstruct the occupant while it is retracted. The upper shielding can be quickly moved into a protective position in front of an occupant during a collision threat.

The shielding confines the occupant to prevent momentum from propelling him against rigid portions of the vehicle and the like. The barrier provides shielding that has large cushioning surfaces to which the occupant's body bears during a collision. The large bearing areas allow a low bearing pressure to safely transmit the occupant's momentum force into the shielding, the shielding, yielding to an extent as the force is absorbed. There are means to prevent objectionable rebounding of the shielding against the occupant. The shielding may have means to cause the momentum of an operator's body to be harnessed to the barrier to form a battering ram. The battering ram means can bend a steering wheel to lengthen a deceleration path thereby allowing the operator to be decelerated slower and thus safer by reducing the intensity of the bearing pressure of his body against the barrier.

The barrier of the present invention has improvements over the barrier shown in my copending Pat. application Ser. No. 549,835 and in my older patents. The present application describes improvements that include retraction of the upper shielding laterally and downwardly to the extent that it assumes a position that is below the window portions of an automobile or the like, and the retracted position is far enough away from an occupant it is protecting, so the upper shielding does not obscure or obstruct the portions of the occupant's body that are above the hips. The retracted upper shielding is compactly folded so that it fits into a small space and it is largely hidden or inconspicuous to viewers of the occupant it protects. The present barrier has more complex supporting means than the barrier means described in my earlier patent applications, but it does not have certain objectionable characteristics of the older barrier means, including: obscuring portions of the occupant's torso or head when the shielding is retracted; obstructing the line of sight to the instrument panel when the shielding is retracted; minor obstructions to free arm movement of an operator-occupant, and/or having characteristics that would tend to trap an occupant when the barrier is highly deformed during an accident. The present barrier means would not bind the upper portions of the occupant's arms and shoulders, as would the fabric barrier described in my copending Pat. application Ser. No. 549,835. The present barrier includes slidable seat means that can be superimposed over a conventional seat.

Another improvement includes means to trip a control to cause the upper shielding to automatically unfold and move upwardly and laterally into a protective position confronting the head and chest of the operator without obstructing the operator's freedom to manipulate the vehicle during and after these positioning movements.

Although the vehicle barrier is shown as being incorporated into an automobile, it may be incorporated into other vehicles.

An object of my invention is to provide a retractable shieldlike, cushionable vehicle occupant safety barrier that is mounted in a vehicle, with means to cause the shielding to be positioned closely in front of an occupant to protect the occupant during a very rapid deceleration caused by a collision—shielding that protects the upper portion of the occupant's body, being retractable laterally and downwardly when an accident is not imminent, so as not to obscure or obstruct the occupant and so as to hide or make the shielding inconspicuous.

Another object of my invention is to provide a barrier having cushioning shielding that is compactly folded so that it does not obscure or obstruct the upper portion of the occupant when the shielding is in a retracted position, upper portions of the shielding being mounted on a vehicle door so the upper shielding swings outwardly with the door when the door is opened, thereby providing unobstructed access space to and from the occupant's seat, including space to allow the occupant to escape from the vehicle after a collision.

Still another object of my invention is to provide a retractable cushioning vehicle occupant safety barrier that is positioned in front of and interconnected with a slidable portion of a seat of a vehicle, the barrier having shielding that can be folded and be retracted laterally and downwardly so that it does not obscure or obstruct the upper portion of the occupant.

A still further object is to provide a cushionable vehicle occupant safety barrier that has retractable shielding positioned in front of, and interconnected with, a slidable portion of a seat of a vehicle, the shielding confronting the operator to harness the operator's momentum during a collision, to cause the barrier to act as a battering ram to bend the steering wheel to lengthen a deceleration path to obtain a longer period in which to decelerate the operator's body during a collision, supports for shielding being positioned so as to allow unobstructed space for access to and from the seat. The shielding has retracting means that folds the shielding and moves it laterally and downwardly so that it does not obscure or obstruct the upper portion of the operator's body when the shielding is in a retracted position, and the shielding has support means that allows the operator unobstructed space in which to make movements to control the vehicle when the shielding is in a protective position.

Other objects and advantages of the present invention will become more apparent from a study of the following description taken with the accompanying drawings wherein:

FIG. 3 is a fragmentary, sectional view taken along line 3–3 of FIGS. 1 and 2;

FIG. 4 is a fragmentary, sectional view taken along line 4–4 of FIG. 3;

FIG. 5 is a view similar to FIG. 2, but showing barrier shields acting during a collision;

FIG. 6 is an enlarged, fragmentary, sectional view taken along line 6-6 of FIGS. 1 and 3 before upper shielding is moved into protective positioning;

FIG. 7 is a view similar to FIG. 6, except that it shows shield supporting means in a fully retracted position;

FIG. 8 is an enlarged, fragmentary, sectional view taken along line 8-8 of FIG. 6;

FIG. 9 is an enlarged, sectional view taken along line 9-9 of FIG. 6;

FIG. 10 is an enlarged, fragmentary view taken along line 10-10 of FIG. 2;

FIG. 11 is a sectional view taken along line 11-11 of FIG. 10;

FIG. 12 is a sectional view taken along line 12-12 of FIG. 10;

FIG. 13 is a fragmentary, sectional view taken along line 13-13 of FIG. 6;

FIG. 14 is a view similar to FIG. 2, but showing upper shielding retracted below a window sill;

FIG. 15 is a view similar to FIG. 4 but showing the head shield in a retracted position;

FIG. 16 is a view similar to FIG. 4 but showing the face shield retracted upwardly;

FIG. 17 is an enlarged, fragmentary, sectional view taken along line 17-17 of FIG. 10;

FIG. 18 is an enlarged, fragmentary, sectional view taken along line 18-18 of FIG. 10;

FIG. 19 is an enlarged, fragmentary, sectional view taken along line 19-19 of FIG. 10;

FIG. 20 is an enlarged, sectional view similar to FIG. 4, showing details of upper shielding;

FIG. 21 is an elevational view similar to FIG. 10 but showing a modification including a slidable head shield;

FIG. 22 is a view similar to FIG. 21 but showing the head shield and a pair of shoulder shields in retracted position;

FIG. 23 is a fragmentary, sectional view taken along line 23-23 of FIG. 21;

FIG. 24 is an elevational view taken along line 24-24 of FIG. 21;

FIG. 25 is a fragmentary view similar to FIG. 24, but showing a head shield that is partially unfolded;

FIG. 26 is a fragmentary, plan view showing a yieldable splice for stiffening wires;

FIG. 27 is a fragmentary, elevational view showing a groove and pocket for a control cable.

Figure 1:
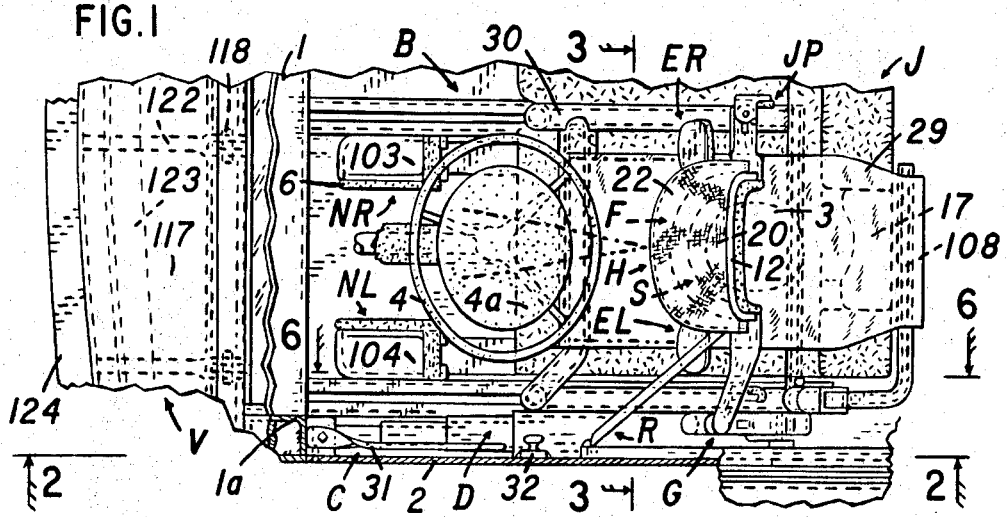
FIG. 1 is a fragmentary plan view showing barrier shield means positioned in front of the operator of an automobile.

Referring more particularly to the drawings, FIGS. 1 to 20 inclusive show a cushionable safety barrier means B that is mounted in a vehicle body 1 which may be an automobile body. The barrier B includes pivotal, retractable main shielding. The barrier B has a torso or chest shield S that is cantilevered out from a telescoping cushioning thrust arm or cylinder D. The cylinder D is mounted on the interior of a door 2. The shielding of the barrier B confronts an occupant 3. The occupant is positioned in the seat J. A head shield H is pivotally mounted on the shield S. The head shield H can be retracted downwardly so it overlays the front of the shield S. A transparent visor or face shield F is pivotally mounted on the shield H. The shield S is pivotally mounted so as to allow it to be retracted laterally and downwardly. FIGS. 1 to 5 show the shields S and H in protective positions in front of the occupant 3. FIG. 14 shows the shields S and H in fully retracted positions. FIG. 15 shows the head shield H in a retracted position, while the torso shield S remains in a protective position. FIG. 16 shows shields S and H in protective positions, but with the face shield F in an overhead retracted position.

The seat J has a slidable portion JP. The slidable seat portion JP is shown interconnected with the cylinder D and the shielding of the barrier B. A bearing surface means such as the seat belt W is engaged to the slidable seat portion JP. Shoulder shields ER and EL are pivotally mounted on the shield S. Shields ER and EL are retractable to allow an occupant 3, who is the operator, to keep his arms extended while steering and to allow the shielding to be more compact when it is retracted. When the shoulder shields are in their protective positions, they restrain and thus protect the occupant's shoulders and the upper portions of his arms. The occupant would lower his arms to allow the shields ER and EL to spring into protective positions. The occupant may protect the lower portions of his arms by sliding them into a mufflike portion M of the shield S. Foot shields NR and NL are connected to the slidable seat portion JP. The shields NR and NL restrain and thus allow cushioning of the lower portions of the occupant's legs. Knee shields, shown in my U.S. Pat. No. 3,392,989, may be fastened to the slidable seat portion JP, to provide bearing surface means confronting the knees.

The shield S is shown positioned between a steering wheel 4 and the occupant 3 who is an operator. The shield S may also be mounted in front of an occupant 3 who is a passenger. The slidable seat portion JP slides forwardly in unison with the shields of the barrier B when the occupant 3 is propelled forwardly against the shields by his momentum, when the vehicle is decelerated quickly during a collision. A catch means C prevents the thrust arm D and thus the shields from rebounding objectionably after an occupant's momentum has forced the shields forwardly. The shielding of a barrier B may also be positioned in front of conventional vehicle seats or other types of seats (not shown).

Figure 2:
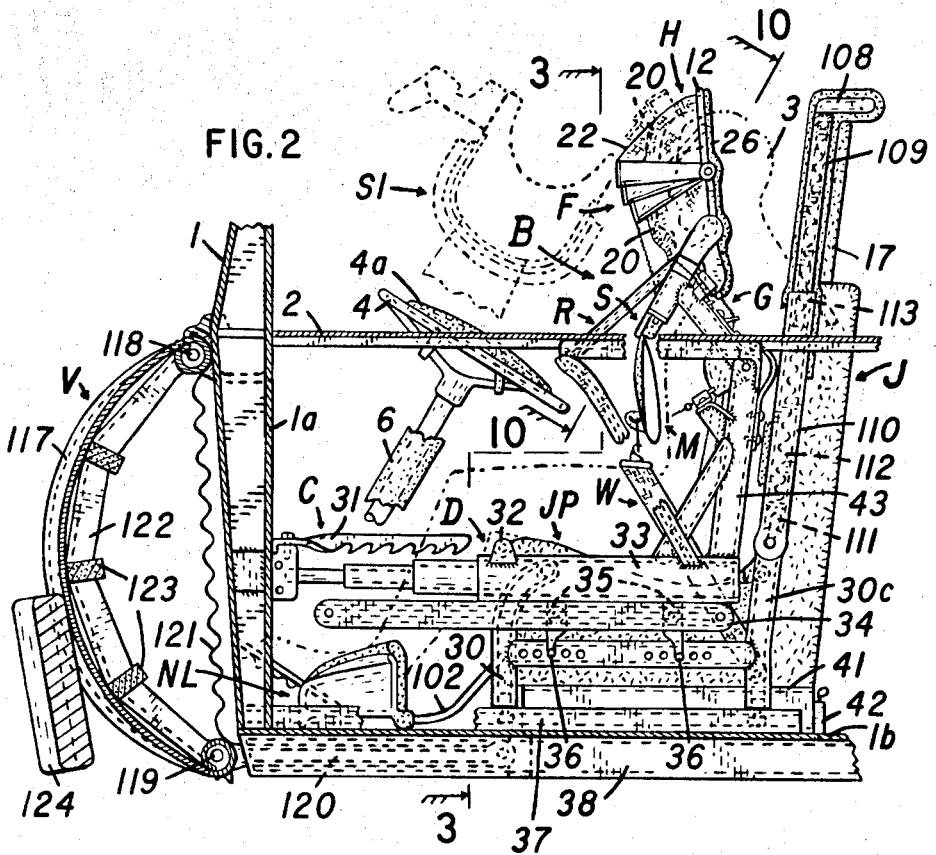
FIG. 2 is a fragmentary, sectional view taken along line 2–2 of FIG. 1.

As shown in FIGS. 2, 4 and 20, a gap may be maintained between the occupant 3 and the shields S and H. except when the occupant prefers to bear against the shields when there is imminent danger of a collision accident. During a violent deceleration, such as that from a collision, the occupant 3 would be propelled forwardly from his position shown in FIG. 1 to a position against the shielding of the barrier B, as shown in FIG. 5. The momentum thrust of the occupant 3 against the shields S and H is transmitted into the cylinder D. The momentum thrust of the lower portion of the occupant's torso and legs against the safety belt W, and the foot shields NR and NL, is transmitted into the slidable seat portion JP, the seat yielding and transmitting the thrust into the cylinder D.

The shield S has a strong stiff panel 5 that can greatly resist forces that tend to deform it during a collision. The panel 5 is covered with cushioning padding 6 adjacent to the occupant. The padding may be sponge rubber or the like, or it may be inflated rubber padding. Cushioning padding 6 may in general be attached to hard surfaces of the barrier B adjacent to the occupant. Such padding 6 is shown, except where the showing would cause vague delineation of mechanical parts that are beyond the padding. The mufflike portion M of the shield S may be made of strong sheeting 7, such as plastic or cloth. The sheeting 7 is looped to form a mufflike shape. The sheeting 7 acts as a hinge where it is attached to the panel 5. The muff M may have a fastener 8 that is engageable with a hook 9 on the belt W. The engagement of the muff M to the belt W prevents the occupant's arms from pivoting forwardly when they are confined in the muff, during a collision. When an occupant has his arms in the muff M., he would tend to interlock his arms by clasping his hands to his elbows. When a muff M is to be positioned between an operator and a steering wheel 4, the muff M may have a strong stiff curved panel portion 10 adjacent to the steering wheel, with padding 6 behind the stiff portion, so occupant's arms are shielded from the steering wheel 4. The strong stiffening 10 may have a hook 11 fastened to it. The hook can engage the lower portion of the steering wheel 4, whereby momentum of the operator 3 against the shielding S and the belt W is harnessed to cause the wheel 4 deform when the shielding is forced forwardly during a collision. The hook 11 may be covered with padding as shown, to shield the occupant's hands from the hook. A strong padded buffer plate 4a on the steering wheel 4, would coact with the muff M to allow the occupant's momentum to safely deform the steering wheel 4 and its column, to increase the deceleration path for the occupant.

The panel 5 is shown sloping to a small degree to suit an occupant, particularly a woman whose back is resting against the sloping back of the seat J. A barrier B that is made for use with a vertical se steering column and a vertically backed seat would have a panel 5 positioned almost vertically for a man occupant. For the purpose of clarity, the shield S is said to be positioned substantially vertically when it is in the protective position.

The head shield H has a strong stiff U-shaped frame 12 that is pivotally mounted with hinges K onto the upper portion of the shield S. Each hinge K includes a coiled spring 13 which tends to cause the frame 12, and thus the whole shield H, to pivot upwardly from a retracted position shown in FIG. 15, to the protective position shown in FIG. 2. Each hinge K has a hinge pin 14. A pair of spring latches 15 are fastened to the panel S. Each hinge pin 14 has a square shoulder that engages a square hole in the frame 12. A large round shoulder portion of a pin 14, engages a hole in a hinge plate 16. Hinge plates 16 are welded to the panel 5. The ends of each spring 13 engages a hole in a pin 14 and a hole in a hinge plate 16. The bolts of the latches 15 engage teeth in the heads of the hinge pins 14, as shown in FIG. 19, to restrain the shield H from pivoting forwardly when the head of the occupant 3 is forced against it by momentum during a collision. The occupant's head is restrained from whipping back excessively by a headrest 17. The headrest 17 has a plug that fits into the back of the seat J.

The shield H has spring steel wires 18 and 19 to form a frame that confronts a portion of the face of the occupant. The wires 18 and 19 are pivotally mounted to pins 12a and 12b on the frame 12 as shown in FIG. 20. The ends of the wires 18 and 19 have corrugations that are hooked into the frame 12. The corrugations act as springs to force the wires into the positions shown in FIG. 20. Tough foldable sheeting 20 is attached to the wires 18 and 19, the frame 12 and the panel 5. The edging of the sheeting 20 has a hem to confine and slidably engage the wires. The sheeting 20 may have padding 6 fastened to it. Thick padding is shown as it would likely be preferred when there is sufficient space between the door 2 and the steering wheel 4 to allow for thickly padded barriers.

When thick padding 6 would be objectionable in thickening the head shield or be objectionable in cost, the head shield H may be made without the thick padding, similar to the use of sheeting without padding as shown in FIG. 24, in which the occupant's head bears directly against the sheeting during a collision. Such sheeting may be made of nylon so it can yield to an extent to cushion the head. Padding may be used to cushion the occupant's head against the wires 18 and 19, or the wires may be yieldably spliced like the splice shown in FIG. 26, with a thin flexible tube 21 slidably engaging the end portion of the wires, so the wires can safely yield when the head bears against the sheeting 20 that covers the wire.

A tough outer foldable sheet 22 may be attached to the frame 12 and to the face shield F, to prevent broken glass from passing through the gap between the shield F and the sheeting 20. Sheeting 20 and 22 shields the occupant's head from possible showers of fine glass particles that are caused by the cracking of laminated safety glass. Sheeting 20 and 22 would provide some protection from large fragments of windshield glass. Sheeting 20 and 22 may include flexible wire fabric or the like, to resist large fragments of glass.

The transparent face shield F is formed by stiff transparent plastic or the like segments 23, 24 and 25. The segments are pivotally mounted. Segments 23, 24 and 25 have shapes that allow them to telescope or nest compactly. Stepped offsets on frame 12 space the segments so they overlap to provide a shield against falling glass splinters. The gaps between the segments provide a ventilating means. Flanged means or the like on the ends of the segments engage with each other and cause the segments to coact when they are lowered and raised. Elastic-cloth tape springs 26 may be attached to the sides of the frame 12 and to the segment 23, to cause the segments to pivot into the retracted positions shown in FIG. 16. The shield F would be retracted when the occupant prefers an unobstructed opening confronting his face, such as when atmospheric conditions tend to cause fogging of the segments. A cord 27 is attached to the segment 25. The cord 27 has a hook 27a fastened to it. The hook 27a is hooked to an eyelet 28 on the shield S, to hold the segments in the protective positions. The hook 27a is disengaged from the eyelet 28 to allow the segments 23, 24 and 25 to pivot upwardly into retracted positions. The cord 27 may be elastic to allow it to shorten when it rises with the shield F, so it does not dangle in front of the occupant's eyes. There is a large space between the shield F and the occupant's eyes so that spectacles worn by occupant will not touch the shield F during a collision.

The head shield H is wider than the occupant's head, so the shield does not strike the head when the head is positioned slightly off to a side from the center of the shield. The belt W tends to restrain the occupant from being nonaligned with the shield S. Furthermore, the upright portion of the seat J may have a concave shape, like that of a bucket seat, to help keep the occupant aligned with the shields. The headrest 17 is recessed to allow the occupant to momentarily tilt his head back into the recess to center his head with the shield H, to prevent the shield from striking his head as the shield moves into its protective position.

The shield S is mounted so that it may be pivoted laterally away from the front of the occupant 3, so the shielding does not confront the occupant when there is no immediate danger of a collision. The shield S may be retracted by being pivoted laterally and downwardly so the shields S and H do not obscure or obstruct the occupant 3 to any extent when there is little danger of a collision. The retracted positions of the shields S and H are adjacent to the door 2, as shown in FIG. 14. The door 2 with the shields S and H retracted against it, may be readily swung open and closed without the shielding being a nuisance or a hindrance to the occupant. The shield S along with the shield H can be triggered to force them to move rapidly into the protective positions from the fully retracted positions, when a hazardous condition develops.

The space between the shield S and the back of the seat J allows the occupant 3 to move from behind the shield so he can pivot his torso and head downwardly only to the seat J. when the vehicle rolls over during an accident. In general, after a collision, the occupant can slide sideways past the shields S and H, thus he is not likely to be trapped by the shielding. The slidable seat portion JP yields by sliding forwardly without the remainder of the seat J moving forwardly. This means allows the occupant to escape readily from behind the shields S and H, after a collision, as the rigid rear portion of the seat J does not bear against him, thus tending not to trap him. The seat portion JP has a pliable sheet 29, that overlays the fixed portion of the seat J. The sheet 29 may be made of nylon The slidable seat portion JP has a strong tubular seat base frame 30. The sheet 29 is attached to the front and to the rear of the frame 30. Padding 6 is used to cover the frame 30 adjacent the occupant.

If the catch C deforms during a collision and allows the rear portion of the cylinder D to be propelled backwardly by deformation of the portion of the vehicle 1 that confronts the cylinder D, the seat frame 30 would strike the fixed upright back of the seat J and thus force the seat J backwardly, thereby maintaining space for the occupant between the shield S and the back of the seat J, thus preventing the occupant from being crushed. The seat J may be a conventional automobile seat, with the seat portion JP superimposed on it.

During a collision, when the occupant's momentum is transmitted through the shielding into the cylinder D, the force is absorbed by compressing springs that are confined in tubes of the cylinder D. The cylinder D yields and telescopes when the springs yield. The catch means C prevents the release of the force build built up in the cylinder D until it is manually released after the occupant is clear of the path into which the shields rebound. The cylinder D and the catch C are like cushioning cylinder and catch that are described in my U.S. Pat. No 3,129,017. The catch C has a spring steel bar 31 that has rachet teeth. A pin 32 that is fastened to a rear cylinder portion 33 of the cylinder D engages the rachet teeth when the cylinder is compressed by the occupant's momentum. The rachet teeth restrain the pin 32 and thus the shielding from moving backwardly when the springs in the cylinder tends to rebound after the forward force has been spent.

A snubber (not shown), similar to a snubber described in my U.S. Pat. No. 2,827,305, may be used if preferred, rather than a catch means C. The cylinder D may have a piston and hydraulic fluid to create bleeding action to cushion some of the momentum force. The hydraulic means to cushion may be in addition to the spring means. The means to use hydraulic bleeding action to cushion the momentum force is fully described in my U.S. Pat. No. 2,977,135. U.S. Pat. No. 2,977,135 also fully described hydraulic means that allows the use of hydraulic fluid and pump means to adjust the shields laterally toward towards the rear or the front.

The cylinder D may have an adjusting means (not shown) to adjust the force absorbing spring or hydraulic bleeding means to suit the weight of the occupant. Such adjusting means are well known. They include an adjustable diaphragm opening to vary the hydraulic bleeding action and takeup means to vary the spring means.

The front of the cylinder D bears against the corner post $a$ or the like, so the forward end of the cylinder D is restrained from moving forwardly. A track 34 on the door 2 supports and positions the cylinder D. Two T-shaped connectors 35 have sliding and interlocking engagement with the track 34. When the door 2 is opened to an extent, two pins 36 which are attached to the cylinder portion 33 retract from spaced holes in the seat base 30. The door 2 has strong hinges and a strong latch (not shown). The door latching may be similar to safe latching shown in my U.S. Pat. No 2,827,305.

The shielding of the barrier B is adjusted laterally to obtain a position that allows the gap between the occupant 3 and the shields S and H. Air can circulate through the gap to allow the occupant to keep cool during hot weather. The gap tends to prevent chafing and wrinkling of the occupant's clothes. The pins 36 are selectively engaged to the spaced holes in the seat base 30, to adjust the seat longitudinally.

The seat base frame 30 has two front legs 30$b$ and one rear leg 30$C$. These legs are interlocked with and slidably engage rails 37. The rails 37 are fastened to the floor 1$b$. The floor 1$b$ may be reinforced with beams 38. The nonslidable portion of the seat J may be mounted on a support 41 and the like. A seat latch 42 may be used to latch the nonslidable portion of the seat to the floor 1$b$.

As shown in FIGS. 6 and 7, the shield S is mounted on support means which includes a tubular post 43. The post 43 is fastened to the top of the cylinder portion 33. A tube 44 braces the post 43. A pivotal arm G is mounted on the post 43. The arm G has a lower arm portion 45 that in is pin-connected to the post 43. The arm G includes a hinge P. An upper arm portion 46 is attached to the hinge P. The hinge P has a tube 49 that is rigidly attached to the lower arm 45. The upper arm 46 is rigidly attached to the panel 5 of the shield S. A spring 47 forces the arm G to pivot upwardly in response to tripping of a spring actuated main latch 48. The latch 48 engages the upper notch in a plate 53 to hold the shield S in the low retracted position. The plate 53 is welded to the lower arm 45. When the shield S is in a fully retracted position, and the occupant foresees that a collision is imminent, he can pull a main control cable 54 or pull the handle of the latch 48 to retract the bolt of the latch 48, to allow the spring 47 to quickly force the shield S and H to move upwardly to the position S1 that is shown in FIG. 6, and is indicated by the phantom outline in FIG. 2. After the latch 48 is pulled, a train of latches are automatically tripped to allow the shields S and H to move farther. The latch 48 engages a lower notch in the plate 53 to lock the arm G in the raised position shown in FIGS. 2, 3, 5 and 6. When the arm G reaches an intermediate position that is close to the extreme upper position, the pivotal movement tightens or takes up the slack in a cable 55, causing the cable to pull the control on a spring latch 56, which causes the latch bolt to disengage from a catch notch in a hinge pin 57 of the hinge P.

When the latch 56 is disengaged from the hinge pin 57, a coiled spring 58 causes the hinge pin 57 to pivot the arm 46 laterally, thus pivoting the shield S laterally until it reaches a protective position close to the occupant, then a tooth in the hinge pin 57 automatically engages the latch bolt of a spring actuated latch 59. An offset on the pin 57 engages a limit block 60 on the arm 45 to prevent the arm 46 from pivoting past the protective position. Just before the arm 46 completes its lateral pivoting movement, a cable 65 partially wraps around the hinge pin 57 and thus takes up the slack in the cable, causing the cable to pull the control on the spring latch 66, to unlatch its bolt from engagement with a notch in the frame 12 of the shield H, thereby allowing the head shield H to pivot upwardly into the protective position. A flange on the top portion of the panel 5 acts as a limit stop to prevent the frame 12 from pivoting past the protective position.

Modified means to move the shields into protective positions may readily be substituted for the springs an and latches shown. Hydraulic or pneumatic cylinders (not shown) or the like, may be used effectively, including their use to easily retract the shields.

The ring handle of the latch 59 is pulled to cause unlatching to allow the shield S to be retracted laterally.

The hinge pin 57 has rachet teeth to cause the bolt of the latch 59 to grip a tooth to prevent the arm 46 from being forced to pivot forwardly when the occupant strikes the shield S before the shield has reached the protective position confronting the occupant. This provides a limited degree of protection when there is not enough time for the shield S to be fully moved into a protective position.

The shield H also includes rachet teeth on the hinges K, to cause latches 15 to restrain the shield H from pivoting downwardly when the occupant's head strikes it before it reaches the extreme protective position.

The control cable 54 may be attached to the latch 47 and to the firewall of the vehicle. The cable 54 may be rigged so it may be made taut by pressure against it by the occupant's leg or hand, to cause the bolt of the latch 48 to unlatch. The cable 54 allows an operator 3 to keep his hands on the steering wheel 4 while his leg that is not on the brake pedal can pressure the cable 54.

When a collision thrust is likely to be from an angle, such as the frequent angular collision thrust that strikes the left front portion of a vehicle, when the operator veers the vehicle just before a collision, the latch 59 and the rachet teeth on the hinge pin 57, allow the occupant 3 to laterally twist the upper portion of his body and to lean forward to an extent so as to stop the pivoting of the shield S at the desired angle to meet the angular thrust directly.

A pivotal manual control 67 is mounted on the brace 44 with a pin 67$a$. The control 67 may have a resilient handle and a plug to engage a socket in the brace 44. The handle of the control 67 is pressured to bend it away from the brace 44 to disengage the plug from the socket to allow the control to be pivoted. When nonhazardous conditions are prevalent, the occupant may restrain the shield S from pivoting laterally to the protective position, by pivoting the handle of the control 67 downwardly until the control reaches the position 67$b$.before pulling the latch 48. A phantom outline indicates the position 67$b$. This positioning of the control 67 causes the cable 55 to slacken to a great degree, thus the cable cannot pull the latch 56 to cause it to disengage from the notch in the hinge pin 57. When a hazardous condition occurs, the occupant pivots the handle of the control 67 upwardly, causing the cable 55 to pull the bolt of the latch 56 to disengage it from the notch in the hinge plate 57, allowing the shield S to pivot laterally towards the front of the occupant.

When preferred, the occupant may keep the shield H positioned low in the folded position against the shield S, (see FIG. 15), when the shield S is confronting him, by pivoting a manual control 68 to prevent the shield H from automatically pivoting into its protective position. The control 68 is made and mounted like the control 67. The handle of the control 68 is pivoted downwardly until the control reaches the position 68b to prevent the shield H from pivoting into its protective position. This positioning of the control 68 increases the slack of the cable 65—thus the cable 65 cannot pull the latch 66 to cause it to disengage from the notch in the frame 12. When hazardous highway conditions develop, the occupant pivots the handle of the control 68 upwardly, causing the cable 65 to pull the bolt of the latch 66 to disengage it from the frame 12, allowing the shield H to pivot vertically to the protective position confronting the occupants's head.

A retractable brace R may be used to restrain the arm G from deforming when the occupant is pressured against the shields S and H. The brace R includes a tubular shaft 69. The brace R is pivotally engaged to the arm 46 and to a brace guide 70. Ball fittings 75 and 76 are fastened to the ends of the shaft 69. The ball 75 engages a socket in the arm 46. The ball 76 engages a slotted track in the brace guide 70. The lower end of the brace R is forced to rise and move laterally by movements of the arm 46, when the shield S is being pivoted laterally into a protective position. A spring sheet clip 77 on the arm 46 bears against the shaft 69 to cause the lower end of the brace to rise to the upper end of the guide 70 when the shield S moves into the protective position. The spring 77 tends to prevent the ball 76 from binding to the track in the guide 70. The brace guide 70 is welded to the cylinder D. A slidable bar 78 is fastened to the top of the guide 70 and to the post 43. The bar 78 slidably engages the groovelike window sill portion of the door 2. The bar 78 keeps the post 43 and the guide 70 in alignment with the door 2, and allows the brace R to move with the shields. The lower end of the shaft 69 bears against a block 70a on the upper end of the guide 70, when the shield S is in the protective position.

The working position of the brace R is high enough to allow the occupant to freely use his left arm. The brace R may be omitted, but such an omission would require a much stronger and much larger supporting means, especially a stronger hinge P.

The arm G and the brace R can effectively resist the momentum thrust of the upper portion of an occupant against the shields S and H. As the head and upper portion of the torso do not weigh a great amount, because the head is a small mass and the upper portion of the torso is largely hollow, therefore the momentum thrust is low enough so as to make the arm G and the brace R economically and physically feasible.

The shoulder shields ER and EL may be kept retracted behind the panel 5 until there is need to move them into protective positions. The padding 6 on the shield S adjacent to the shields ER and EL is attached so as to provide pocket means into which the shields ER and EL retract.

Each of the shoulder shields ER and EL has a panel 79. Each panel 79 is pivotally mounted with a pin 80. Each pin 80 has a pin arm 81 that engages a spring 82. Each spring 82 is anchored to the panel 5. The springs 82 force the shields to pivot outwardly from the retracted positions shown in FIG. 6 to the protective positions shown in FIG. 10. The shields ER and EL would preferably be retracted behind the shield S when the shield S is retracted, so they cannot objectionably strike the occupant's arms when the shield S is moved into its protective position. The shields ER and EL are are held in their retracted positions by the frame 12. When the latch 66 releases the frame 12, the frame 12 pivots upwardly, thus releasing panels 79 to allow them to pivot outwardly. Limit blocks on the panel 5 limit the pivoting of the panels 79. When the occupant 3 is the operator, his arms may be extended forwardly to an extent while operating the vehicle. Thus when the shield H is pivoted upwardly, the operator's arms would restrain the shields ER and EL from pivoting outwardly. The operator may pivot his arms backwardly just before a collision to allow the shields ER and EL to pivot outwardly into protective positions. When the shields ER and EL are in protective positions, they would tend to limit the reach of the operator's arms to an extent. When an operator 3 prefers to keep the shields S and H in a protective position while travelling, a restraining cord 85 may be used to keep the shields together and keep them retracted until they are needed. A friction type plug and socket connecting means 86 splices the cable. The operator pulls the cord 85 to break the connection 86 to allow the shields ER and EL to spring into protective positions. During a collision, occupant's shoulders would tend to pivot forwardly to cause them to bear against these shields.

The arm 46 and an arm 90 would help restrain an occupant from being hurled towards the ceiling of the vehicle during a rollover accident. The arm 90 is attached to the panel 5. A fixed side shield 91 and a retractable side shield 92 may be used to help restrain an occupant from being forced aside during a collision. The side shield 91 may be rigidly attached to the arm 46. The shield 92 is pivotally mounted as shown in FIGS. 11 and 12, to allow it to be retracted downwardly, as shown in FIG. 6. Retraction means of the shield 92 allows the shield to be retracted to provide additional clearance for the occupant to slide past it after a collision. Retraction of the shield 92, also makes the combined shields more compact in thickness so they can clear the steering wheel 4 when the shields are fully retracted. While the shield H is in a retracted position, the shield 92 is retracted, as it is held by a cable 93 that is rigged to a notch in a hinge pin 14, as shown in FIG. 19. Movement of the frame 12 into a protective position, causes the pin 14 to pivot and slacken the cable 93, which allows a spring 96 on a hinge pin 97 to force the shield 92 to move into a protective position. A limit stop 98 limits the pivotal movement of the shield 92. A spring actuated latch 99 restrains the shield 92 from pivoting laterally when the occupant's shoulder bears against it.

The shield 92 may be omitted, particularly when the door 2 has a weak latching means that may fail during a collision and allow the door to swing open. A shield 92 would tend to push the occupant out of the vehicle when the door 2 swings open, or the shield 92 would push and pivot the occupant down on the seat. The padding 6 on the shield 92 would tend to prevent injury to the occupant. The omission or retraction of the shield 92, allows the shield S to swing outwardly with the door 2. The hook 9 would deform and release the shield S if the door 2 swung open during a collision.

The foot shields NR and NL are interlocked and slidably engaged to bent bar rails 102. The bars 102 are attached to the seat portion JP. The foot shields NR and NL have strong shoelike shells 103 and 104. During a collision, the occupant may quickly move his feet sideways into the shields NR and NL, so the momentum of the feet pressures the feet forwardly against padding 6 in the shells. The shields NR and NL yield with the seat portion JP during a collision. The bars 102 allow the shields NR and NL to stop and/or be pushed backwards towards the seat portion JP during a collision when the shields strike a nonyielding obstruction, such as a deformed portion of the firewall The When the occupant's feet are positioned in the shields NR and NL, the occupant's legs are bent at the knees so the legs are less likely to be stoved when decelerating violently. The bars 102 act as ramps for the shields NR and NL, when the shields top and the seat portion JP moves closer to them. Ramp action causes the foot shields NR and NL to tilt, thus forcing the feet to tilt so the seat portion JP can move forward farther. The bars 102 tend to restrain the shields NR and NL from moving out of alignment.

The slidable seat portion JP may have backing means to cushion and restrain the flight of an occupant whose head and torso portion are forced backwardly by a rear end collision against the vehicle. The sheeting 29 which is fastened to the seat frame 30, may extend upwardly and be fastened to a horizontal tube 108 that is attached to the mast tube 109. The mast 109 is mounted on a lower mast or tube 110. The mast 110 is pivotally supported by the seat frame 30, so mast means may be tilted if it is used with a conventionable tiltable seat, to allow access to and from the rear seat of a vehicle. A handle 111 is pivoted to lock or unlock the mast 110 from a set position. The tube 109 may be welded to the tube 110 to form a fixed mast means.

The mast means may be retractable so the horizontal tube 108 can be retracted to the position shown in FIG. 14. This retraction of the tube 108 would be useful when the headrest 17 is omitted. A headrest 17 and/or extended mast would not clear the steering wheel 4 when a tiltable seat is tilted to allow access space.

The mast 109 may be a rectangular tube slidably mounted in the tube 110 which would also be rectangular. A spring 112 is confined in the mast tubes. A latching means 113 may be rigged to the barrier latching system to cause the latch 113 to automatically trip when the shield S is tripped. The spring 112 would force the inner mast 109 and the horizontal tube 108 upwardly. When the mast means is retracted and the headrest 17 is omitted, the sheeting 29 would be slack. When the mast 109 is retracted and a headrest 17 is used, the horizontal tube 108 would include a spring wound takeup spool (not shown), to take up the slack of the sheeting 29. The spool would have a rachet means to prevent the spool from uncoiling the sheeting 29. A retractable mast 109 may have padding that is hoselike in form.

The extended mast would help prevent the vehicle roof from caving in during a rollover accident.

Although I have shown a cylinder D as a force absorbing means to absorb the occupant's momentum during a collision, the supporting means for the shields may be fixed, so the shielding cannot yield forward within the vehicle. The barrier means may have a highly cushionable bumper portion V. The bumper portion V is a force absorbing means on the front of the vehicle to adequately cushion the occupant. Such force absorbing means as the bumper V or the like would be necessary in small vehicles including small automobiles which are so compact that an adequate deceleration path cannot be made within the occupant's compartment. Conventional bumpers yield little without breaking, so they cannot provide adequate cushioning of collision impacts, as can the bumper V. Bumpers that are similar to the bumper V are described in my U.S. Pat. Nos. 3,056,462 and 3,056,627, also in my copending Pat. application Ser. No. 675,592. The bumper V may have a bowed shell or skin 117 that is pivotally mounted with pin means 118 and 119. Spaced pivotal links 120 engage the pin means 119 and pin means on the beams 38. A corrugated steel sheet 121 or the like ties across the bow of the shell 117. Vertical yieldable rib means 122 stiffen the shell 117. Horizontal ribs 123 may be used to spread a localized impact against the bumper V. A collision impact by the object 124 against the shell 117 causes the shell and the rib means 122 to flatten, as shown in FIG. 5, sheet 121 yieldingly resisting the impact force. The sheet 121 may be resilient. The object 124 may be an opposing vehicle. During most automobile collisions that cause injury, great force is absorbed which causes permanent deformation of the vehicles. The bumper V would tend to be highly deformed by crushing action in absorbing collision forces, thus the crushing of the bumper V would prevent objectional rebounding of the vehicle. The bumper V tends to raise the adjacent portion of the vehicle, when the lower portion of the bumper V strikes the roadway 125.

When a less costly vehicle occupant safety barrier like barrier B is required, the torso shield and head shield modifications shown in FIGS. 21 to 27, may be used instead of the shields S and H. The modifications include a torso or chest shield SM and a partially slidable head shield HM. The shield HM may have a foldable transparent plastic face shield FM. Shields SM, HM and FM are substantially symmetrical about their vertical axes. The shield SM has a strong stiff panel 130. The panel 130 has a pair of grooved track portions 130a. A U-shaped head shield frame 132 slidably engages the track portions 130a. The frame 132 supports foldable sheeting 133 to which the occupant's head bears during a collision. The sheet 133 may be made of my nylon. A pair of coiled springs 134 are attached to the frame 132 and to the offsets 130b on the panel 130. A latch 66 holds the frame 132 in a retracted position until it is tripped.

The springs 134 may be covered with elastic cloth tubes (not shown) to shield the springs from the occupant. A pair of limit stops 132a on the frame 132 engage the offsets 130b to limit the travel of the frame 132 to the protective position shown in FIG. 21. A pair of stops 130c on the lower portion of the panel 130, limits the downward movement of the shields HM to a retracted position. A pair of shoulder shields ERM and ELM are similar to the shields ER and EL. The intermediate portion of the frame 132 is offset from the panel 130 to create a space for the shoulder shield springs 82 and the pin arms 81. The frame 132 is locked into a protective position by the spring locks 137 that engage the bottom corners of the frame. The spring locks 137 bend into recesses when the frame 132 is lowered into the retracted position.

The sheeting 133 is folded when the shield HM is retracted. A U-shaped band 138 is pin connected to upper end portions of the frame 132. The wire band 138 is formed with two slightly resilient wires 138a and 138b that are yieldably spliced with a thin resilient sleeve 21, as shown in FIG. 26. The wire band 138 raises the sheeting 133 to a protective position. The wires 138a and 138b and the sleeve 21 are encased in a hem in the upper edging of the sheeting 133. The yieldable splicing means allows the band 138 to yield so the force of the occupant's head is taken by the sheeting 133, thus the head is not bruised or cut by the band 138.

The sheeting 133 is fastened to the inner edge portion of the frame 132. The sheeting 133 may have a face opening 133a confronting a portion of the face of the occupant 3. The face opening 133a may have a slightly resilient wire framework 140 encased in the hem of the sheeting opening. The framework 140 may be formed with wires 140a and 140b that are yieldably spliced with a sleeve 21 to form the frame work around the face opening. The wires 140a and 140b are looped to form spring hinges that are adjacent to the longitudinal extremities of the face opening 133a. The wire frames 140a and 140b are compressed when the shield HM is retracted.

Padding 6 is used on at least the upper portions of the frame 132 that are closely adjacent to the occupant. If preferred, additional padding 6 may be fastened against the inside of the sheeting 133, like the padding shown for shield H. Such padding would yield locally to allow it to conform to the bone structure of the occupant's head, so as to bear better against the head, by thus reducing the intensity of the bearing pressure. Pins 145 in the upper extremities of the frame 132 have sw square shoulders to engage square holes formed by ends of the wires 138a and 138b, and square holes in the spring stop clips 146. Coiled springs 147 pivot the pins 145 and raise the sheeting 133. After the frame 132 is retracted, the sheeting 133 and wires 137 138 and 140, with or without thick padding 6, would be folded down against the panel 130 to their fully retracted positions shown in FIG. 22.

The folded parts are held in the folded retracted positions by the fabric band 148. The band 148 is fastened to the underside of the panel 130 and it is banded over the folded parts and fastened with a spring clip 149 to a socket in the lower edge of the panel 130. When the latch 66 releases the frame 132, the springs 134 are strong enough to bend and release the clip 149 as they pull the frame 132 upwardly into a protective position.

The band 138 is thus loosened which allows the springs 147 to pivot the wires 138a and 138b to raise the sheeting 133 into the protective positioning. Offsets 132c on the upper extremities of the frame 132 limit the upward pivoting of the wires 138. The wires 138a and 138b are restrained from pivoting downwardly by the spring stops 146. An end of each stop 146 springs outwardly and over the frame 132 so that it bears against the frame 132 to restrain the wires 138 from pivoting downwardly. When the frame 132 is released by the latch 66, the limit stops 132a pressure the shoulder shield cord 85 to cause the cable plug and socket 86 to disengage, thereby causing the shields ERM and ELM to pivot into protective positions.

As shown in FIG. 25, the foldable portion of the shield HM may be kept in a partially protective position when the occupant is keeping the shield SM in a protective position. The band 148 may be detached from underside of the panel 130 and be attached to the top of the foldable sheet 133. When the occupant fails to move the control handle 68, to release the shield HM, the lower portion of the occupant's face would contact and bear against the shield HM. When the occupant does trip the latch 66 with the handle 68, the partially retracted shield HM would move into protective position more rapidly than it could move from a fully retracted position.

The face shield FM has a tough foldable transparent plastic sheet 153, such as "Mylar". The sheet 153 may have a strong sheet edging 154. The shields HM and FM may have grommets that are connected with pins 155 to allow the shield FM to pivot upwardly to a retracted position when atmospheric conditions cause fogging. The shield FM is similar to the foldable transparent face shield described in my copending Pat. application Ser. No. 549,835.

The side shield 92 can coact with the shield HM. As shown in FIG. 27 a groove 132d and widened pocket 132e is in the portion of the frame 130 that is adjacent to the side shield 92. The cable 93 has a knot that is placed in the pocket 132e. A portion of the cable 93 is placed in the groove 132d. When the shield HM is retracted, the cable 93 tightens and pulls the side shield 92 into a retracted position. When the shield HM moves into a protective position, the cable 93 slackens and disengages from the frame 132 thus allowing the shield 92 to pivot into its protective position.

Although I have shown and described barrier means that would provide a high degree of protection for an occupant, modifications including subcombinations may obviously be made to provide limited protection. Barrier means without retracting means may obviously be used effectively.

The barrier means would obviously be made largely of various types of metals. Strong plastics may obviously be used instead of metal for many parts.

While I have illustrated and described several embodiments of my invention, it will be understood that these are by way of illustration only, and that various changes and modifications may be made within the contemplation of my invention and within the scope of the following claims.

I claim:

1. In a vehicle having a seat means for an occupant, in combination, a main shield means confronting at least upper portions of said occupant support means mounted in said vehicle, said support means including side mounting means for supporting said main shield means in a substantially vertical protective position so that said upper portions of said occupant can bear against said main shield means when said vehicle decelerates and momentum forces said occupant forwardly, said main shield means including rigid portion means confronting at least the upper portion of the torso of said occupant, said main shield means also including a head shield means confronting at least a portion of the head of said occupant, said head shield means comprising frame means mounted on said rigid portion means, said head shield means including head bearing surface means confronting at least the forehead of said occupant, said head bearing surface means comprising foldable sheet means and being of a construction to allow the occupant to see therethrough, said main shield means including movable mounting means of said head shield means, said head shield means being foldable to retract it downwardly adjacent the chest of said occupant, whereby said head shield means can be kept retracted so as not to obscure or obstruct the head of said occupant when nonhazardous conditions are prevalent.

2. A combination as recited in claim 1 wherein said head shield means includes a collapsible transparent face shield means.

3. A combination as recited in claim 1 wherein said support means is yieldable in a forward direction of said vehicle for allowing yieldable movement of said main shield means in a forward direction of said vehicle in response to said momentum forcing said occupant against said main shield means due to a high degree of deceleration of said vehicle, whereby said occupant can decelerate slower than said vehicle.

4. A combination as recited in claim 3 together with yieldable force absorbing means to gradually cushion said occupant during a collision.

5. A combination as recited in claim 4 wherein said occupant is an operator and wherein said vehicle includes a steering wheel means confronting said operator, and wherein said main shield means includes engaging means that engage said steering wheel means when said main shield means yields forwardly, thereby causing said momentum to be harnessed so that said main shield means acts as a battering ram, whereby the deceleration path of said operator is increased.

6. A combination as recited in claim 4 together with second bearing surface means for engaging at least upper portions of the legs of said occupant, said second bearing surface means being interconnected with said support means, said support means allowing yieldable movement of said second bearing surface means in a forward direction of said vehicle in response to said momentum of said occupant, whereby said occupant is safely cushioned during rapid deceleration caused by a collision.

7. A combination as recited in claim 6 wherein said second bearing surface means includes at least a seat belt, whereby said occupant is safely confined and cushioned during a rapid deceleration of said vehicle.

8. A combination as recited in claim 4 wherein said seat means includes a soft pliable rebound-protective sheet positioned in bearing relationship at least substantially vertically behind said occupant, said pliable sheet being interconnected with said support means and being movable forwardly when said main shield means moves forward, whereby said occupant is confined to protect him from moving backwardly with whiplash action when said vehicle is impacted from behind after a head-on collision.

9. A combination as recited in claim 4 wherein said side mounting means includes pivotal means to pivot said main shield means substantially laterally to a side lateral position beside said occupant, whereby said occupant can quickly position said main shield means into said protective position so he can be cushioned during a collision.

10. A combination as recited in claim 4 wherein said side mounting means includes pivotal means to pivot said main shield means substantially laterally to a side and to pivot it downwardly to a low retracted position beside said occupant, whereby said main shield means does not obscure or obstruct said occupant when it is retracted.

11. A combination as recited in claim 1 wherein said main shield means includes a pair of shoulder shields pivotally mounted on said rigid portion means and confronting shoulders of said occupant, said pair of shoulder shields being retractable to retracted positions adjacent said chest, said main shield means also including spring means and tripping means, said spring means causing said pair of shoulder shields to pivot into positions confronting said shoulders in response to said tripping means.

12. A combination as recited in claim 1 together with power means, said power means including means to raise said head shield means after it has been retracted, whereby said head can be readily protected.

13. A combination as recited in claim 12 wherein said side mounting means includes lateral pivotal means to pivot said main shield means substantially laterally away from the front of said occupant to a side lateral position beside said occupant, whereby said occupant is free of said main shield means when conditions are nonhazardous.

14. A combination as recited in claim 13 wherein said power means includes means to force said rigid portion means to move from a retracted position to a confronting position that confronts said upper portion of said torso, whereby little effort is needed to move said rigid portion means into said confronting position for protecting said occupant.

15. A combination as recited in claim 1 wherein said main shield means includes a side shield means pivotally mounted above a shoulder of said occupant, said side shield means extending downwardly below the side of said shoulder, said side shield means being retractable, said side shield means including power means and side tripping means, said power means causing said side shield means to move into position to protect said occupant in response to said side tripping means, whereby said side shield means prevents said shoulder from moving past it when said momentum tends to force said occupant aside.

16. A combination as recited in claim 1 wherein said support means engages said main shield means at substantially shoulder height, whereby the adjacent arm of said occupant can be moved freely.

17. A combination as recited in claim 1 wherein said main shield means includes a muff portion means at its lower extremity, said muff portion means comprising a looped sheet into which said occupant can insert his forearms, whereby the arms of said occupant are restrained from straightening out during a violent deceleration.

18. A combination as recited in claim 1 wherein said movable mounting means includes at least, in part, a slidable mounting.

19. A combination as recited in claim 18 wherein said movable mounting means includes pivotal means and wherein said frame means includes at least a stiff substantially U-shaped slider means having its transverse central portion positioned downwardly, and wherein said frame means includes a stiff bowed portion means that is pivotally mounted on the upper portions of said U-shaped slider means, and wherein said foldable sheet means is fastened to said U-shaped slider means and to said stiff-bowed portion means, whereby said occupant is protected to a high degree.

20. A combination as recited in claim 19 together with power means, said power means forces said U-shaped slider means to slide upwardly and forces said stiff-bowed portion means to pivot upwardly after said head shield means has been retracted, whereby said head shield means can be quickly moved into a protective position with little effort.

21. A combination as recited in claim 20 together with retarding means to allow said stiff-bowed portion means to be pivoted partially upwardly and be held at an intermediate position until said power means is tripped, whereby movement of said head shield means to a fully protective position can be effected rapidly.

22. A combination as recited in claim 1 wherein said movable mounting means includes at least, in part, a pivotal mounting.

23. A combination as recited in claim 1 wherein said vehicle includes a door and wherein at least a portion of said support means is supported by said door, whereby access space is clear when said door portion is open.

24. A combination as recited in claim 1 wherein said side mounting means includes pivotal means to pivot said main shield means substantially laterally to a side and to pivot it downwardly to a low retracted position beside said occupant, whereby said main shield means does not obscure or obstruct said occupant when it is retracted.

25. A combination as recited in claim 24 wherein said side mounting means is adjacent an interior side portion of said vehicle and wherein said interior side portion includes a lower portion that is opaque, and wherein said retracted position of said main shield means is below the top of said opaque portion, whereby said occupant is not obstructed or obscured by said main shield means when it is retracted.

26. A combination as recited in claim 24 together with a steering wheel means mounted in said vehicle and confronting said occupant, and wherein said occupant is the operator of said vehicle and wherein said main shield means is moved laterally above said steering wheel means as it moves into said protective position, whereby said operator can freely steer said vehicle while said main shield means is moving into said protective position.

27. In a vehicle having a seat for an occupant, in combination, a main shield means confronting at least upper portions of said occupant, support means mounted in said vehicle, said support means including mounting means for supporting said main shield means in a substantially vertical protective position so that said upper portions of said occupant can bear against said main shield means when said vehicle decelerates and momentum forces said occupant forwardly, said mounting means including pivotal means to pivot said main shield means substantially laterally to a side and to pivot it downwardly to a low retracted position beside said occupant, whereby said occupant is free of said main shield means until he causes it to move into said protective position when a hazardous condition develops.

28. A combination as recited in claim 27 wherein said support means is yieldable in a forward direction of said vehicle for allowing yieldable movement of said main shield means in a forward direction of said vehicle in response to said momentum of said occupant against said main shield means due to a high degree of deceleration of said vehicle, whereby said occupant can decelerate slower than said vehicle.

29. A combination as recited in claim 28 together with power means to force said main shield means to move from said retracted position to said protective position, whereby said occupant is readily protected.

30. A combination as recited in claim 29 together with yieldable force absorbing means to gradually cushion said occupant during an accident.

31. A combination as recited in claim 29 wherein said power means includes intermediate control means to allow said main shield means to be kept in a high retracted side position until said intermediate control means is tripped to allow said power means to move said main shield means laterally into said protective position.

32. A combination as recited in claim 28 together with a brace means, said brace means including a brace track, said brace track being fastened to said support means, said brace means being pivotally engaged to said support means adjacent said main shield means, and being pivotally and slidably engaged to said brace track, said brace means being retractable to a position adjacent a side of said occupant when said main shield means is retracted, whereby said support means is restrained from deforming when said occupant bears against said main shield means during a collision.

33. A combination as recited in claim 28 together with yieldable force absorbing means to gradually cushion said occupant during an accident.

34. A combination as recited in claim 33 wherein at least a portion of said seat is slidably mounted and wherein said slidable portion of said seat is interconnected with said main shield means so as to move with the same lineal speed forwardly, whereby said occupant can remain seated while he is decelerated slower than said vehicle.

35. A combination as recited in claim 33 together with bearing surface means confronting at least upper portions of the legs of said occupant, said bearing surface means being interconnected with said main shield means so as to move with the same lineal speed forwardly, whereby a great momentum of said upper portions of said legs and torso of said occupant are cushioned during deceleration.

36. A combination as recited in claim 33 together with foot shield means confronting at least the front of the feet of said occupant, said foot shield means being interconnected with said main shield means so as to move with the same lineal speed forwardly, whereby said occupant can decelerate safely.

37. A combination as recited in claim 33 wherein said force absorbing means includes rebound preventing means, whereby said main shield means is restrained from rebounding and propelling said occupant backwardly.

38. A combination as recited in claim 27 together with power means to force said main shield means to move from said retracted position to said protective position, whereby said occupant is readily protected.

39. A combination as recited in claim 27 wherein said support means is adjacent an interior side portion of said vehicle and wherein said interior side portion includes a lower portion that is opaque, and wherein said retracted position is below the top of said opaque portion, whereby said occupant is not obstructed or obscured by said main shield means when it is retracted.

40. A combination as recited in claim 27 wherein said main shield means includes a muff portion means at its lower extremity, said muff portion means comprising a looped sheet into which said occupant can insert his forearms, whereby the arms of said occupant are restrained from straightening out during a violent deceleration.

41. A combination as recited in claim 27 wherein said main shield means includes a collapsible head shield means, whereby said upper portions of said occupant are protected to a high degree.

42. A combination as recited in claim 41 wherein said head shield means includes a collapsible transparent face shield means.

43. A combination as recited in claim 41 wherein said head shield means comprises frame means pivotally mounted, said head shield means including head bearing surface means confronting at least the forehead of said occupant, said head bearing surface means comprising at least foldable sheet means and being of a construction to allow said occupant to see therethrough.

44. A combination as recited in claim 27 wherein said support means engages said main shield means at substantially shoulder height, whereby the adjacent arm of said occupant can be moved freely.

45. A combination as recited in claim 27 wherein said main shield means includes a plurality of latch means and wherein said main shield means moves into said protective position in response to tripping of said latch means.

46. A combination as recited in claim 45 wherein said latch means includes auxiliary control means to allow said main shield means to be kept in a high side position until said auxiliary control means is tripped to allow said main shield means to move laterally into said protective position.

47. In a vehicle having a seat for an occupant, in combination, a main shield means confronting at least upper portions of said occupant, support means mounted in said vehicle, said main shield means including a muff portion means at its lower extremity, said muff portion means comprising a looped sheet into which said occupant can insert his forearms, whereby the arms of said occupant are restrained from straightening out during a violent deceleration.